July 24, 1934.    J. W. HANSEN    1,967,505
MECHANICAL MOVEMENT
Filed March 7, 1932    2 Sheets-Sheet 1
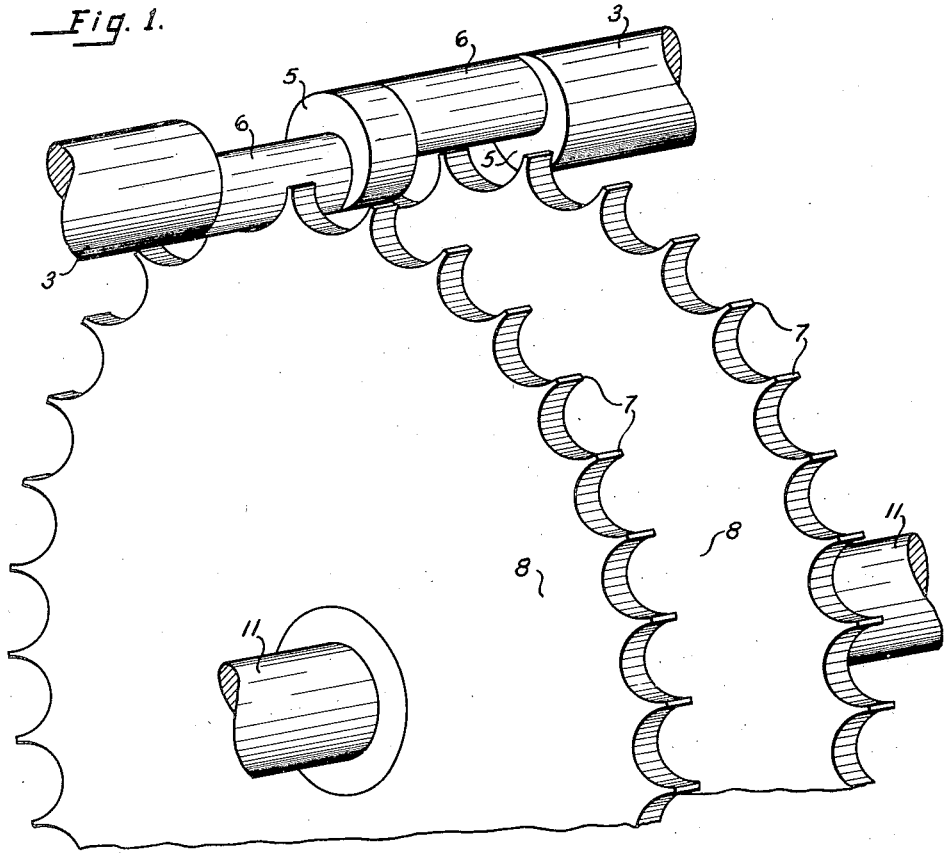
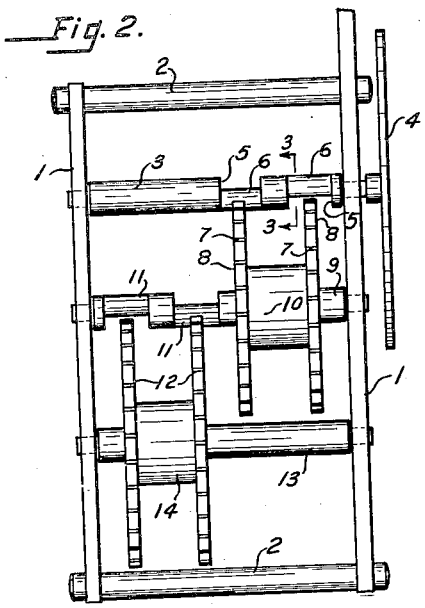
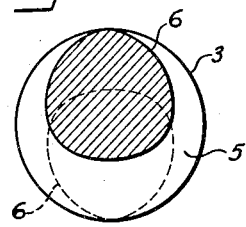
INVENTOR
JULIUS W. HANSEN.
BY
Toulmin & Toulmin
ATTORNEY

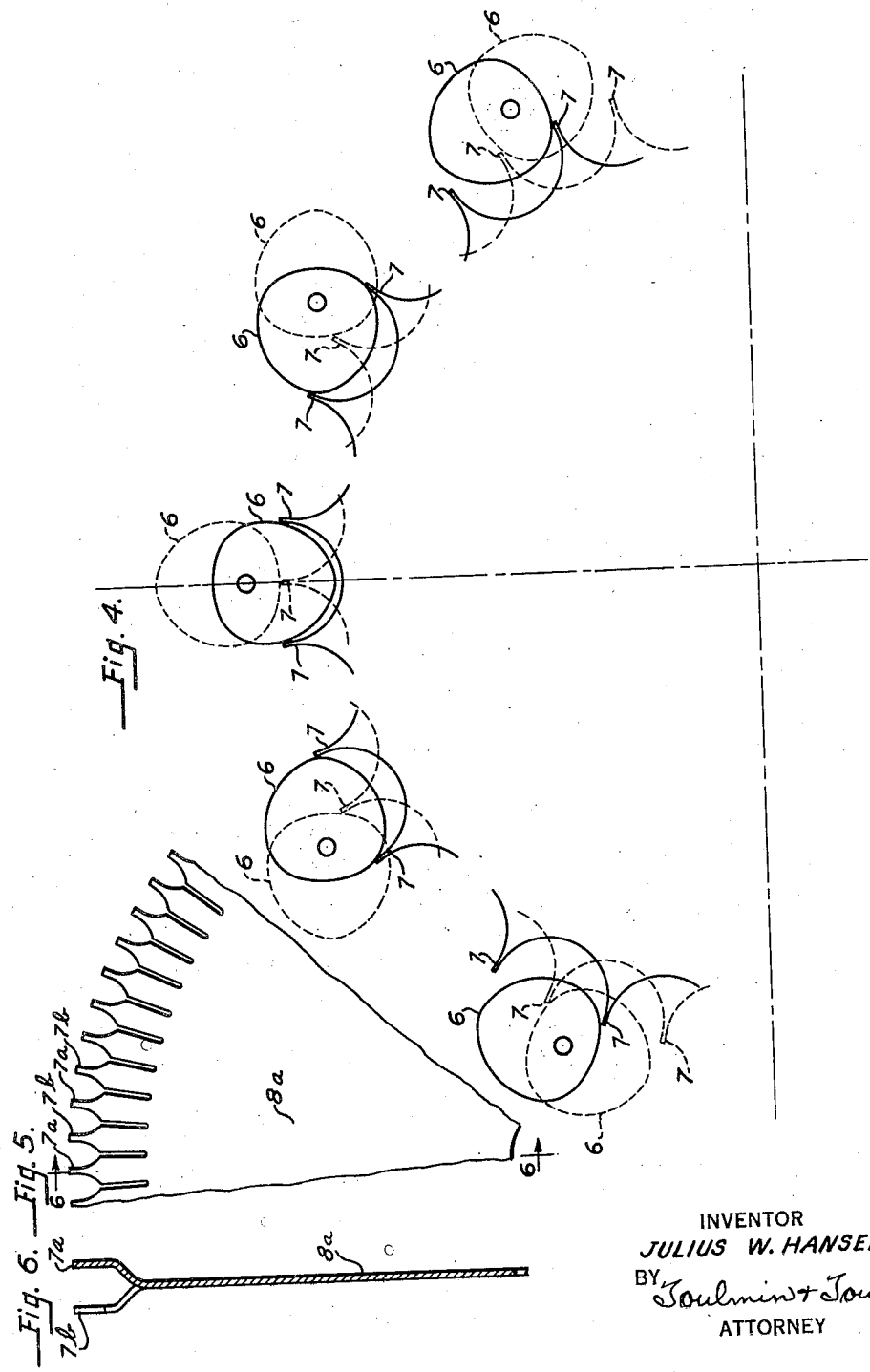

Patented July 24, 1934

1,967,505

UNITED STATES PATENT OFFICE 1,967,505

MECHANICAL MOVEMENT

Julius W. Hansen, Princeton, Ind.

Application March 7, 1932, Serial No. 597,196

1 Claim. (Cl. 74—449)

This invention relates to improvements in mechanical movements, and has for its object to provide a speed reduction means that is substantially equal to a worm gear without having the disadvantages of such a gear.

In the present invention all the shafts are parallel and the parts thereon can be cheaply and easily manufactured. On one shaft there is located a plurality of toothed discs, which have meshing therewith cam members formed on a shaft by cutting opposite parts of the shaft away to leave a structure somewhat similar to a crank structure. This crank structure engages the teeth, which are arranged in alternate positions on the respective discs so that when one crank is engaging the teeth of one disc the other is out of engagement. By multiplying the number of shafts any degree of speed reduction may be obtained.

The invention further comprehends, as one of its objects, the provision of a shaft with eccentric portions, conforming in section to the type of tooth engaged, successively engaging different teeth of the same gear or different teeth of different gears.

The further advantages of this invention will appear from the following description taken in connection with the drawings.

Referring to the drawings:

Figure 1 is a perspective view showing a part of two discs, with a shaft having cams thereon engaging the teeth on the discs.

Figure 2 is a front elevation of a reduction gear arrangement.

Figure 3 is a section on the line 3—3 of Figure 2.

Figure 4 is a diagrammatic view showing the various positions of the rotating cams which engage the teeth of the disc to cause it to rotate.

Figure 5 is a modified form of disc in which only one disc is used, on the periphery of which the teeth are arranged alternately in opposite directions.

Figure 6 is a section on the line 6—6 of Figure 5.

This reduction gear mechanism may be used in various places and for various purposes, but it is particularly well adapted for use in connection with clocks. A whole system of gear reduction mechanism is shown in Figure 1.

The numeral 1 is used to designate supporting plates. These plates may be of any shape or form desired, just as long as they are capable of performing the functions for which they are used. In the present instance there are two of these plates connected by two rods 2, one at the top and the other at the bottom of the plate.

Rotatably mounted near the upper ends of these plates is a shaft 3, which has thereon, outside of the plates, a disc 4. This disc may be used for any purpose. It may serve as a balance wheel. On the shaft, between the two plates, are two elongated notches 5. These notches are on diametrically opposite sides of the shaft and serve to form cams 6, which are likewise on diametrically opposite sides of the shaft. These cams are heart-shaped, as shown in Figure 3. Each of these cams engages teeth 7 on one of two discs 8.

These discs are mounted upon a shaft 9, and are held in spaced relationship thereon by means of a sleeve 10. This shaft is rotatably mounted on the side plates 1, and has notches similar to notches 5 found in shaft 3. By means of these notches there is provided, on diametrically opposite sides of the shaft 9, cams 11, similar in shape and arrangement to cams 6. These cams are adapted to engage teeth 12 on two discs fixed to a shaft 13, and held in spaced relationship thereon by means of a sleeve 14. By rotating the shaft 3 the shaft 9 is caused to rotate at a much slower speed, and shaft 13 at a more greatly reduced speed.

By means of this notch and cam structure a very efficient gear reduction means is provided. The action of the cams on the gear wheel is partly a rolling motion and partly a sliding motion, differing in this way from worm gearing, in which the driving is nearly all by frictional engagement.

The operation of applicant's device is shown in Figure 4. In this figure the cams are rotating in a clockwise direction. On the lefthand of this figure the cam member 6 is shown just entering the notch between two adjacent teeth on the periphery of the disc. The next position shows the cam in a position to fill the space between the ends of adjacent teeth without extending to the bottom of the notch between the teeth.

The next movement shows the cam after it has made one-half of a complete revolution. In this position the cam is resting substantially in the bottom of the notch formed between two adjacent teeth. In the next position the cam is seen leaving the notch and is in a position about 180 degrees from that shown in the second position. In the last position the cam is leaving the notch and has finished its working cycle of movement.

When the cam shown in full line is finishing its cycle of movement the cam shown in dotted line is beginning its cycle of movement. This dotted line indicates the second cam on the operating shaft. The operation is continuous. When one cam is idle the other one is operating to rotate its disc and thereby rotate the shaft. In the form shown in Figure 5 only one disc is used. On this disc or wheel two sets of teeth are formed, which are bent alternately in opposite directions. These teeth are engaged by a suitable form of operating shaft.

In Figures 5 and 6 there is shown a modified form of disc. In each disc shown in these figures the periphery of the disc is slitted to form tooth elements, each tooth element having its opposite edges cutaway to form a tooth and every other tooth is bent in a direction opposite to that in which the other elements are bent. The teeth are bent to extend in planes parallel to the disc. The shape of the teeth is well shown in Figure 6. The teeth located on one side of the disc are indicated by the numeral 7a, while the other teeth bent to extend on the opposite side of the disc are indicated by 7b. The disc as a whole is indicated by the numeral 8a.

In this form only one disc is used. With the teeth of the disc shown in Figures 5 and 6 a cam shaft similar to that shown in Figure 1 is used, each cam engaging the set of teeth on one side of the disc.

I desire to comprehend within my invention such modifications as may be embraced within my claim and the scope of my invention.

Having thus fully described my invention, what I claim as new and desire to secure by Letters Patent, is:

In a mechanical movement, a disc having teeth formed on the periphery thereof, every other one of the teeth being bent in opposite directions, each tooth having on each edge an arcuate seat, and a shaft having formed in its periphery a pair of cams, one for the teeth bent in one direction and the other for the teeth bent in the other direction, said cams engaging the teeth in the arcuate seats.

JULIUS W. HANSEN.